(12) United States Patent
Lunttila et al.

(10) Patent No.: US 10,270,581 B2
(45) Date of Patent: Apr. 23, 2019

(54) METHOD AND APPARATUS FOR DERIVING SECONDARY CELL HYBRID-AUTOMATIC REPEAT-REQUEST TIMING

(71) Applicant: Nokia Solutions and Networks Oy, Espoo (FI)

(72) Inventors: Timo Erkki Lunttila, Espoo (FI); Chun Hai Yao, Beijing (CN); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 42 days.

(21) Appl. No.: 15/127,338

(22) PCT Filed: Mar. 21, 2014

(86) PCT No.: PCT/EP2014/055776
§ 371 (c)(1),
(2) Date: Sep. 19, 2016

(87) PCT Pub. No.: WO2015/139781
PCT Pub. Date: Sep. 24, 2015

(65) Prior Publication Data
US 2017/0134144 A1    May 11, 2017

(51) Int. Cl.
*H04L 5/00*    (2006.01)
*H04L 1/18*    (2006.01)
*H04L 1/00*    (2006.01)

(52) U.S. Cl.
CPC .......... *H04L 5/0078* (2013.01); *H04L 1/1812* (2013.01); *H04L 1/1887* (2013.01);
(Continued)

(58) Field of Classification Search
CPC ..... H04L 1/1812; H04L 5/001; H04L 5/0073; H04L 5/0078
See application file for complete search history.

(56) References Cited

U.S. PATENT DOCUMENTS

| | | | |
|---|---|---|---|
| 2013/0155915 A1* | 6/2013 | Park | H04W 72/042 370/280 |
| 2014/0334351 A1* | 11/2014 | Yin | H04L 5/14 370/280 |
| 2017/0134144 A1* | 5/2017 | Lunttila | H04L 5/0078 |

FOREIGN PATENT DOCUMENTS

| | | |
|---|---|---|
| WO | 2014141641 A1 | 9/2014 |
| WO | 2015025953 A1 | 2/2015 |

OTHER PUBLICATIONS

International Search Report received for corresponding Patent Cooperation Treaty Application No. PCT/EP2014/055776, dated Nov. 25, 2014, 4 pages.

(Continued)

*Primary Examiner* — Benjamin H Elliott, IV
(74) *Attorney, Agent, or Firm* — Brake Hughes Bellermann LLP

(57) ABSTRACT

A method and apparatus can be configured to determine uplink-downlink configuration for a primary cell and at least one secondary cell. The method can also include broadcasting the uplink-downlink configuration to user equipment. The user equipment is configured for carrier aggregation. The method can also include enabling dynamic time-division-duplex configuration for the primary cell and/or the at least one secondary cell for the user equipment. The method can also include configuring the user equipment with downlink hybrid-automatic-repeat-request reference uplink-downlink configuration for each cell for which dynamic time-division-duplex configuration is enabled. The method can also include deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

20 Claims, 10 Drawing Sheets

(52) U.S. Cl.
CPC ............ *H04L 1/1896* (2013.01); *H04L 5/001* (2013.01); *H04L 5/0073* (2013.01); *H04L 2001/0092* (2013.01)

(56) References Cited

OTHER PUBLICATIONS

Ericsson, et al., "On support of different TDD UL-DL configurations on different bands", 3GPP Draft; R1-114414, 3rd Generation Partnership Project (3GPP), Mobile Competence Centre; 650, Route Des Lucioles; F-06921 Sophia Antipolis Cedex; France, vol. RAN WG1, No. San Francisco; Nov. 14, 2011-Nov. 18, 2011, Nov. 21, 2011.
Ericsson, "Harq feedback and PUCCH design TDD-FDD CA", 3GPP Draft; R1-135649, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 11, 2013-Nov. 15, 2013, Nov. 1, 2013.
CMCC, "Email discussion summary on Inter-band CA for supporting different TDD UL-DL configuration", 3GPP Draft; R1-120873 67-06 Inter-Band CA for Different TDD UL Configuration, 3rd Generation Partnership Project (3GPP), Mobile Competence Centre; 650 Route Des Lucioles; F-06921 Sophia-Antipolis Cedex; France, vol. RAN WG, no, Dresden, Germany; Feb. 6, 2012-Feb. 10, 2012, Feb. 13, 2012.
"Remaining HARQ Details in TDD eIMTA", 3GPP TSG RAN WG1 Meeting #74bis, R1-134083, Agenda: 7.2.1.3, CATT, Oct. 7-11, 2013, pp. 1-2.
"HARQ Timing in TDD-eIMTA", 3GPP TSG RAN WG1 Meeting #72, R1-130130, Agenda: 7.3.3.3, ZTE, Jan. 1-Feb. 1, 2013, pp. 1-3.
"Updated WID: LTE TDD-FDD joint operation including Carrier Aggregation", 3GPP TSG RAN meeting #61, RP-131399, Agenda: 11.6.1, Nokia Corporation, Sep. 3-6, 2013, 7 Pages.
"3rd Generation Partnership Project; Technical Specification Group Radio Access Network; Evolved Universal Terrestrial Radio Access (E-UTRA); Physical layer procedures (Release 12)", 3GPP TS 36.213, V12.0.0, Dec. 2013, pp. 1-186.
Office action received for corresponding Vietnamese Patent Application No. 1-2016-03788, dated Nov. 21, 2016, 1 page of office action and 1 page of office action translation available.
Office action received for corresponding Canadian Patent Application No. 2942934, dated Jul. 4, 2017, 3 pages.
Office action received for corresponding Japanese Patent Application No. 2016-558326, dated Nov. 28, 2017, 6 pages.
Office action received for corresponding Korean Patent Application No. 2016-7029374, dated Oct. 18, 2017, 6 pages (No translation).
3GPP TSG RAN WG1 Meeting #74 bis, R1-134674; "Discussion on HARQ Issues for eIMTA", Agenda: 7.2.1.3, Potevio, Oct. 7-11, 2013, 4 pages.
3GPP TSG-RAN WG1 #67, R1-114414; "On Support of Different TDD UL-DL Configurations on Different Bands", Agenda: 7.2.1.5, Ericsson, Nov. 14-18, 2011, 6 pages.
3GPP TSG RAN WG1 Meeting #76, R1-140068; "Other Remaining Issues on HARQ in TDD eIMTA", Agenda: 7.2.1.4, CATT, Feb. 10-14, 2014, 3 pages.
3GPP TSG RAN WG1 Meeting #75, R1-135729; "Restrictions on UL/DL Reconfiguration in eIMTA", Agenda: 6.2.1.3, Sharp, Nov. 11-15, 2013, 4 pages.
Office action received for corresponding Japanese Patent Application No. 2016-558326, dated Jul. 19, 2018, 7 pages.

\* cited by examiner

FIG 3

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG 4

| Set # | (Primary cell UL/DL configuration, Secondary cell UL/DL configuration) | DL-reference UL/DL configuration |
|---|---|---|
| Set 1 | (0,0) | 0 |
| | (1,0), (1,1), (1,6) | 1 |
| | (2,0), (2,2), (2,1), (2,6) | 2 |
| | (3,0), (3,3), (3,6) | 3 |
| | (4,0), (4,1), (4,3), (4,4), (4,6) | 4 |
| | (5,0), (5,1), (5,2), (5,3), (5,4), (5,5), (5,6) | 5 |
| | (6,0), (6,6) | 6 |
| Set 2 | (0,1), (6,1) | 1 |
| | (0,2), (1,2), (6,2) | 2 |
| | (0,3), (6,3) | 3 |
| | (0,4), (1,4), (3,4), 6,4) | 4 |
| | (0,5), (1,5), (2,5), (3,5), (4,5), (6,5) | 5 |
| | (0,6) | 6 |
| Set 3 | (3,1), (1,3) | 4 |
| | (3,2), (4,2), (2,3), (2,4) | 5 |
| Set 4 | (0,1), (0,2), (0,3), (0,4), (0,5), (0,6) | 0 |
| | (1,2), (1,4), (1,5) | 1 |
| | (2,5) | 2 |
| | (3,4), (3,5) | 3 |
| | (4,5) | 4 |
| | (6,1), (6,2), (6,3), (6,4), (6,5) | 6 |
| Set 5 | (1,3) | 1 |
| | (2,3), (2,4) | 2 |
| | (3,1), (3,2) | 3 |
| | (4,2) | 4 |

METHOD AND APPARATUS FOR DERIVING SECONDARY CELL HYBRID-AUTOMATIC REPEAT-REQUEST TIMING

RELATED APPLICATION

This application was originally filed as Patent Cooperation Treaty Application No. PCT/EP2014/055776, filed Mar. 21, 2014.

BACKGROUND

Field:

Embodiments of the invention relate to deriving secondary cell hybrid-automatic-repeat-request timing (HARQ).

Description of the Related Art:

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can include determining, by a network entity, uplink-downlink configuration for a primary cell and at least one secondary cell. The method can also include broadcasting the uplink-downlink configuration to user equipment, wherein the user equipment is configured for carrier aggregation. The method can also include enabling enhanced-interference-management-and-traffic-adaptation for the primary cell and/or the at least one secondary cell for the user equipment. The method can also include configuring the user equipment with downlink hybrid-automatic-repeat-request reference uplink-downlink configuration for each cell for which enhanced-interference-management-and-traffic-adaptation is enabled. The method can also include deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

In the method of the first embodiment, deriving the uplink and/or downlink hybrid-automatic-repeat-request acknowledgement timing comprises determining uplink hybrid-automatic-repeat-request acknowledgement timing according to whether the uplink-downlink configurations for the primary cell and the at least one secondary cell are the same or not, and determining downlink hybrid-automatic-repeat-request acknowledgment timing according to whether the downlink hybrid-automatic-repeat-request reference uplink-downlink configurations for the primary cell and the at least one secondary cell are the same or not or whether the uplink-downlink configuration in one serving cell and the downlink hybrid-automatic-repeat-request configuration in another serving cell are the same or not.

In the method of the first embodiment, if the primary cell and the at least one secondary cell have the same uplink-downlink configurations, and if the downlink hybrid-automatic-repeat-request reference configurations are not the same for the primary cell and the at least one secondary cell, then the uplink scheduling of the at least one secondary cell follows system-information-block-1-signaled uplink-downlink configuration.

In the method of the first embodiment, the downlink-reference uplink-downlink configuration for the at least one secondary cell is derived in accordance with Release 11 carrier aggregation rules defined for a case with different uplink-downlink configurations. The only exception compared to Release 11 carrier aggregation rules is that downlink hybrid-automatic-repeat-request reference configuration is used as an input to determine the downlink-reference-uplink-downlink configuration instead of system-information-block-1-signaled uplink-downlink configuration.

In the method of the first embodiment, if the downlink hybrid-automatic-repeat-request reference configurations are the same for the primary cell and the at least one secondary cell, hybrid-automatic-repeat request timing for the at least one secondary cell is derived in accordance with Release 10 carrier aggregation, with the exception that downlink hybrid-automatic-repeat-request configuration is used instead of system-information-block-1-signaled uplink-downlink configuration to determine physical-downlink-shared-channel hybrid-automatic-repeat-request timing.

In the method of the first embodiment, if the uplink-downlink configurations for the primary cell and the at least one secondary cell are not the same, and if the downlink hybrid-automatic-repeat-request reference configurations are the same for the primary cell and the at least one secondary cell, uplink-reference uplink-downlink configuration for the at least one secondary cell is derived according to the rules defined for Release 11 carrier aggregation having different uplink-downlink configurations.

In the method of the first embodiment, a physical-downlink-shared-channel hybrid-automatic-repeat-request timing of the at least one secondary cell is defined according to Release 10 rules, with an exception that physical-downlink-shared-channel hybrid-automatic-repeat-request timing follows downlink hybrid-automatic-repeat-request reference configuration.

In the method of the first embodiment, if the downlink hybrid-automatic-repeat-request configurations are not the same for the primary cell and the at least one secondary cell, the hybrid-automatic-repeat-request timing for the at least one secondary cell is derived in accordance with Release 11 carrier aggregation, with an exception that downlink hybrid-automatic-repeat-request reference configuration is used instead of system-information-block-1-signaled uplink-downlink configuration to determine the downlink-reference uplink-downlink configuration.

In the method of the first embodiment, the method can further include determining downlink-reference hybrid-automatic-repeat-request uplink-downlink configuration and uplink-reference hybrid-automatic-repeat-request uplink-downlink configuration for the user equipment.

In the method of the first embodiment, downlink hybrid-automatic-repeat-request reference configuration replaces system-information-block-1-signaled uplink-downlink configuration in a rule when deriving the secondary cell's downlink-reference uplink-downlink configuration.

In the method of the first embodiment, uplink-reference hybrid-automatic-repeat-request uplink-downlink configuration is determined according to system-information-block-1-signaled uplink-downlink configurations.

In the method of the first embodiment, if the user equipment is configured with time-division-duplex-frequencydivision-duplex carrier aggregation, and the time-division-duplex enhanced-interference-management-and-traffic-adaptation-enabled cell is a primary cell, frequency-division-duplex secondary cell downlink hybrid-automatic-repeat-request timing is determined according to downlink hybrid-automatic-repeat-request reference configuration of the primary cell.

According to a second embodiment, an apparatus can include at least one processor. The apparatus can also include at least one memory including computer program code. The at least one memory and the computer program code can be configured, with the at least one processor, to cause the apparatus at least to determine uplink-downlink configuration for a primary cell and at least one secondary cell. The apparatus can also be caused to broadcast the uplink-downlink configuration to user equipment, wherein the user equipment is configured for carrier aggregation. The apparatus can also be caused to enable enhanced-interference-management-and-traffic-adaptation for the primary cell and/or the at least one secondary cell for the user equipment. The apparatus can also be caused to configure the user equipment with downlink hybrid-automatic-repeat-request reference uplink-downlink configuration for each cell for which enhanced-interference-management-and-traffic-adaptation is enabled. The apparatus can also be caused to derive uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

In the apparatus of the second embodiment, deriving the uplink and/or downlink hybrid-automatic-repeat-request acknowledgement timing includes determining whether the uplink-downlink configurations for the primary cell and the at least one secondary cell are the same or not, and whether the downlink hybrid-automatic-repeat-request reference uplink-downlink configuration for the primary cell and the at least one secondary cell are the same or not.

In the apparatus of the second embodiment, if the primary cell and the at least one secondary cell have the same uplink-downlink configurations, and if the downlink hybrid-automatic-repeat-request reference configurations are not the same for the primary cell and the at least one secondary cell, then the uplink scheduling of the at least one secondary cell follows system-information-block-1-signaled uplink-downlink configuration.

In the apparatus of the second embodiment, the downlink-reference uplink-downlink configuration for the at least one secondary cell is derived in accordance with Release 11 carrier aggregation rules defined for a case with different uplink-downlink configurations, and the only exception compared to Release 11 carrier aggregation rules is that downlink hybrid-automatic-repeat-request reference configuration is used as an input to determine the downlink-reference-uplink-downlink configuration instead of system-information-block-1-signaled uplink-downlink configuration.

In the apparatus of the second embodiment, if the downlink hybrid-automatic-repeat-request reference configurations are the same for the primary cell and the at least one secondary cell, hybrid-automatic-repeat request timing for the at least one secondary cell is derived in accordance with Release 10 carrier aggregation, with the exception that downlink hybrid-automatic-repeat-request configuration is used instead of system-information-block-1-signaled uplink-downlink configuration to determine physical-downlink-shared-channel hybrid-automatic-repeat-request timing.

In the apparatus of the second embodiment, if the uplink-downlink configurations for the primary cell and the at least one secondary cell are not the same, and if the downlink hybrid-automatic-repeat-request reference configurations are the same for the primary cell and the at least one secondary cell, uplink-reference uplink-downlink configuration for the at least one secondary cell is derived according to the rules defined for Release 11 carrier aggregation having different uplink-downlink configurations.

In the apparatus of the second embodiment, a physical-downlink-shared-channel hybrid-automatic-repeat-request timing of the at least one secondary cell is defined according to Release 10 rules, with an exception that physical-downlink-shared-channel hybrid-automatic-repeat-request timing follows downlink hybrid-automatic-repeat-request reference configuration.

In the apparatus of the second embodiment, if the downlink hybrid-automatic-repeat-request configurations are not the same for the primary cell and the at least one secondary cell, the hybrid-automatic-repeat-request timing for the at least one secondary cell is derived in accordance with Release 11 carrier aggregation, with an exception that downlink hybrid-automatic-repeat-request reference configuration is used instead of system-information-block-1-signaled uplink-downlink configuration to determine the downlink-reference uplink-downlink configuration.

In the apparatus of the second embodiment, the apparatus is further caused to determine downlink-reference hybrid-automatic-repeat-request uplink-downlink configuration and uplink-reference hybrid-automatic-repeat-request uplink-downlink configuration for the user equipment.

In the apparatus of the second embodiment, downlink hybrid-automatic-repeat-request reference configuration replaces system-information-block-1-signaled uplink-downlink configuration in a rule when deriving the secondary cell's downlink-reference uplink-downlink configuration.

In the apparatus of the second embodiment, uplink-reference hybrid-automatic-repeat-request uplink-downlink configuration is determined according to system-information-block-1-signaled uplink-downlink configurations.

In the apparatus of the second embodiment, if the user equipment is configured with time-division-duplex-frequency-division-duplex carrier aggregation, and the time-division-duplex enhanced-interference-management-and-traffic-adaptation-enabled cell is a primary cell, frequency-division-duplex secondary cell downlink hybrid-automatic-repeat-request timing is determined according to downlink hybrid-automatic-repeat-request reference configuration of the primary cell.

According to a third embodiment, a computer program product can be embodied on a non-transitory computer readable medium. The computer program product can be configured to control a processor to perform a process including determining, by a network entity, uplink-downlink configuration for a primary cell and at least one secondary cell. The process can include broadcasting the uplink-downlink configuration to user equipment, wherein the user equipment is configured for carrier aggregation. The process can also include enabling enhanced-interference-management-and-traffic-adaptation for the primary cell and/or the at least one secondary cell for the user equipment. The process can also include configuring the user equipment with downlink hybrid-automatic-repeat-request reference uplink-downlink configuration for each cell for which enhancedinterference-management-and-traffic-adaptation is enabled. The process can also include deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

According to a fourth embodiment, a method can include receiving, by a user equipment, uplink-downlink configuration for a primary cell and at least one secondary cell. The method can also include enabling dynamic time-division-duplex configuration for the primary cell and/or the at least one secondary cell for the user equipment. The method can also include configuring downlink hybrid-automatic-repeat-request reference uplink-downlink configuration for each cell for which dynamic time-division-duplex configuration is enabled. The method can also include deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

In the method of the fourth embodiment, deriving the uplink and/or downlink hybrid-automatic-repeat-request acknowledgement timing comprises determining whether the uplink-downlink configurations for the primary cell and the at least one secondary cell are the same or not, and whether the downlink hybrid-automatic-repeat-request reference uplink-downlink configuration for the primary cell and the at least one secondary cell are the same or not.

In the method of the fourth embodiment, if the primary cell and the at least one secondary cell have the same uplink-downlink configurations, and if the downlink hybrid-automatic-repeat-request reference configurations are not the same for the primary cell and the at least one secondary cell, then the uplink scheduling of the at least one secondary cell follows system-information-block-1-signaled uplink-downlink configuration.

In the method of the fourth embodiment, the downlink-reference uplink-downlink configuration for the at least one secondary cell is derived in accordance with Release 11 carrier aggregation rules defined for a case with different uplink-downlink configurations, and the only exception compared to Release 11 carrier aggregation rules is that downlink hybrid-automatic-repeat-request reference configuration is used as an input to determine the downlink-reference-uplink-downlink configuration instead of system-information-block-1-signaled uplink-downlink configuration.

In the method of the fourth embodiment, if the downlink hybrid-automatic-repeat-request reference configurations are the same for the primary cell and the at least one secondary cell, hybrid-automatic-repeat request timing for the at least one secondary cell is derived in accordance with Release 10 carrier aggregation, with the exception that downlink hybrid-automatic-repeat-request configuration is used instead of system-information-block-1-signaled uplink-downlink configuration to determine physical-downlink-shared-channel hybrid-automatic-repeat-request timing.

In the method of the fourth embodiment, if the uplink-downlink configurations for the primary cell and the at least one secondary cell are not the same, and if the downlink hybrid-automatic-repeat-request reference configurations are the same for the primary cell and the at least one secondary cell, uplink-reference uplink-downlink configuration for the at least one secondary cell is derived according to the rules defined for Release 11 carrier aggregation having different uplink-downlink configurations.

In the method of the fourth embodiment, a physical-downlink-shared-channel hybrid-automatic-repeat-request timing of the at least one secondary cell is defined according to Release 10 rules, with an exception that physical-downlink-shared-channel hybrid-automatic-repeat-request timing follows downlink hybrid-automatic-repeat-request reference configuration.

In the method of the fourth embodiment, if the downlink hybrid-automatic-repeat-request configurations are not the same for the primary cell and the at least one secondary cell, the hybrid-automatic-repeat-request timing for the at least one secondary cell is derived in accordance with Release 11 carrier aggregation, with an exception that downlink hybrid-automatic-repeat-request reference configuration is used instead of system-information-block-1-signaled uplink-downlink configuration to determine the downlink-reference uplink-downlink configuration.

In the method of the fourth embodiment, the method can also include determining downlink-reference hybrid-automatic-repeat-request uplink-downlink configuration and uplink-reference hybrid-automatic-repeat-request uplink-downlink configuration for the user equipment.

In the method of the fourth embodiment, downlink hybrid-automatic-repeat-request reference configuration replaces system-information-block-1-signaled uplink-downlink configuration in a rule when deriving the secondary cell's downlink-reference uplink-downlink configuration.

In the method of the fourth embodiment, uplink-reference hybrid-automatic-repeat-request uplink-downlink configuration is determined according to system-information-block-1-signaled uplink-downlink configurations.

In the method of the fourth embodiment, if the user equipment is configured with time-division-duplex-frequency-division-duplex carrier aggregation, and the time-division-duplex enhanced-interference-management-and-traffic-adaptation-enabled cell is a primary cell, frequency-division-duplex secondary cell downlink hybrid-automatic-repeat-request timing is determined according to downlink hybrid-automatic-repeat-request reference configuration of the primary cell.

According to a fifth embodiment, an apparatus can include at least one processor. The apparatus can also include at least one memory including computer program code. The at least one memory and the computer program code can be configured, with the at least one processor, to cause the apparatus at least to receive uplink-downlink configuration for a primary cell and at least one secondary cell. The apparatus can be caused to enable dynamic time-division-duplex configuration for the primary cell and/or the at least one secondary cell for the apparatus. The apparatus can also be caused to configure a downlink hybrid-automatic-repeat-request reference uplink-downlink configuration for each cell for which dynamic time-division-duplex configuration is enabled. The apparatus can also be caused to derive uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

In the apparatus of the fifth embodiment, deriving the uplink and/or downlink hybrid-automatic-repeat-request acknowledgement timing comprises determining whether the uplink-downlink configurations for the primary cell and the at least one secondary cell are the same or not, and whether the downlink hybrid-automatic-repeat-request reference uplink-downlink configuration for the primary cell and the at least one secondary cell are the same or not.

In the apparatus of the fifth embodiment, if the primary cell and the at least one secondary cell have the same uplink-downlink configurations, and if the downlink hybrid-automatic-repeat-request reference configurations are not the same for the primary cell and the at least one secondary cell, then the uplink scheduling of the at least one secondary cell follows system-information-block-1-signaled uplink-downlink configuration.

In the apparatus of the fifth embodiment, the downlink-reference uplink-downlink configuration for the at least one secondary cell is derived in accordance with Release 11 carrier aggregation rules defined for a case with different uplink-downlink configurations, and the only exception compared to Release 11 carrier aggregation rules is that downlink hybrid-automatic-repeat-request reference configuration is used as an input to determine the downlink-reference-uplink-downlink configuration instead of system-information-block-1-signaled uplink-downlink configuration.

In the apparatus of the fifth embodiment, if the downlink hybrid-automatic-repeat-request reference configurations are the same for the primary cell and the at least one secondary cell, hybrid-automatic-repeat request timing for the at least one secondary cell is derived in accordance with Release 10 carrier aggregation, with the exception that downlink hybrid-automatic-repeat-request configuration is used instead of system-information-block-1-signaled uplink-downlink configuration to determine physical-downlink-shared-channel hybrid-automatic-repeat-request timing.

In the apparatus of the fifth embodiment, if the uplink-downlink configurations for the primary cell and the at least one secondary cell are not the same, and if the downlink hybrid-automatic-repeat-request reference configurations are the same for the primary cell and the at least one secondary cell, uplink-reference uplink-downlink configuration for the at least one secondary cell is derived according to the rules defined for Release 11 carrier aggregation having different uplink-downlink configurations.

In the apparatus of the fifth embodiment, a physical-downlink-shared-channel hybrid-automatic-repeat-request timing of the at least one secondary cell is defined according to Release 10 rules, with an exception that physical-downlink-shared-channel hybrid-automatic-repeat-request timing follows downlink hybrid-automatic-repeat-request reference configuration.

In the apparatus of the fifth embodiment, if the downlink hybrid-automatic-repeat-request configurations are not the same for the primary cell and the at least one secondary cell, the hybrid-automatic-repeat-request timing for the at least one secondary cell is derived in accordance with Release 11 carrier aggregation, with an exception that downlink hybrid-automatic-repeat-request reference configuration is used instead of system-information-block-1-signaled uplink-downlink configuration to determine the downlink-reference uplink-downlink configuration.

In the apparatus of the fifth embodiment, the apparatus can also be caused to determine downlink-reference hybrid-automatic-repeat-request uplink-downlink configuration and uplink-reference hybrid-automatic-repeat-request uplink-downlink configuration for the user equipment.

In the apparatus of the fifth embodiment, downlink hybrid-automatic-repeat-request reference configuration replaces system-information-block-1-signaled uplink-downlink configuration in a rule when deriving the secondary cell's downlink-reference uplink-downlink configuration.

In the apparatus of the fifth embodiment, uplink-reference hybrid-automatic-repeat-request uplink-downlink configuration is determined according to system-information-block-1-signaled uplink-downlink configurations.

In the apparatus of the fifth embodiment, if the user equipment is configured with time-division-duplex-frequency-division-duplex carrier aggregation, and the time-division-duplex enhanced-interference-management-and-traffic-adaptation-enabled cell is a primary cell, frequency-division-duplex secondary cell downlink hybrid-automatic-repeat-request timing is determined according to downlink hybrid-automatic-repeat-request reference configuration of the primary cell.

According to a sixth embodiment, a computer program product can be embodied on a non-transitory computer readable medium. The computer program product can be configured to control a processor to perform a process including receiving, by a user equipment, uplink-downlink configuration for a primary cell and at least one secondary cell. The process can also include enabling dynamic time-division-duplex configuration for the primary cell and/or the at least one secondary cell for the user equipment. The process can also include configuring downlink hybrid-automatic-repeat-request reference uplink-downlink configuration for each cell for which dynamic time-division-duplex configuration is enabled. The process can also include deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

According to a seventh embodiment, an apparatus can include determining means for determining uplink-downlink configuration for a primary cell and at least one secondary cell. The apparatus can also include broadcasting means for broadcasting the uplink-downlink configuration to user equipment, wherein the user equipment is configured for carrier aggregation. The apparatus can also include enabling means for enabling dynamic time-division-duplex configuration for the primary cell and/or the at least one secondary cell for the user equipment. The apparatus can also include configuring means for configuring the user equipment with downlink hybrid-automatic-repeat-request reference uplink-downlink configuration for each cell for which dynamic time-division-duplex configuration is enabled. The apparatus can also include deriving means for deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

According to an eighth embodiment, an apparatus can include receiving means for receiving uplink-downlink configuration for a primary cell and at least one secondary cell. The apparatus can also include enabling means for enabling dynamic time-division-duplex configuration for the primary cell and/or the at least one secondary cell for the user equipment. The apparatus can also include configuring means for configuring downlink hybrid-automatic-repeat-request reference uplink-downlink configuration for each cell for which dynamic time-division-duplex configuration is enabled. The apparatus can also include deriving means for deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

BRIEF DESCRIPTION OF THE DRAWINGS

For proper understanding of the invention, reference should be made to the accompanying drawings, wherein:

FIG. 3 illustrates uplink/downlink configurations in accordance with one embodiment.

FIG. 4 illustrates different rules in accordance with one embodiment.

DETAILED DESCRIPTION

Figure 1:
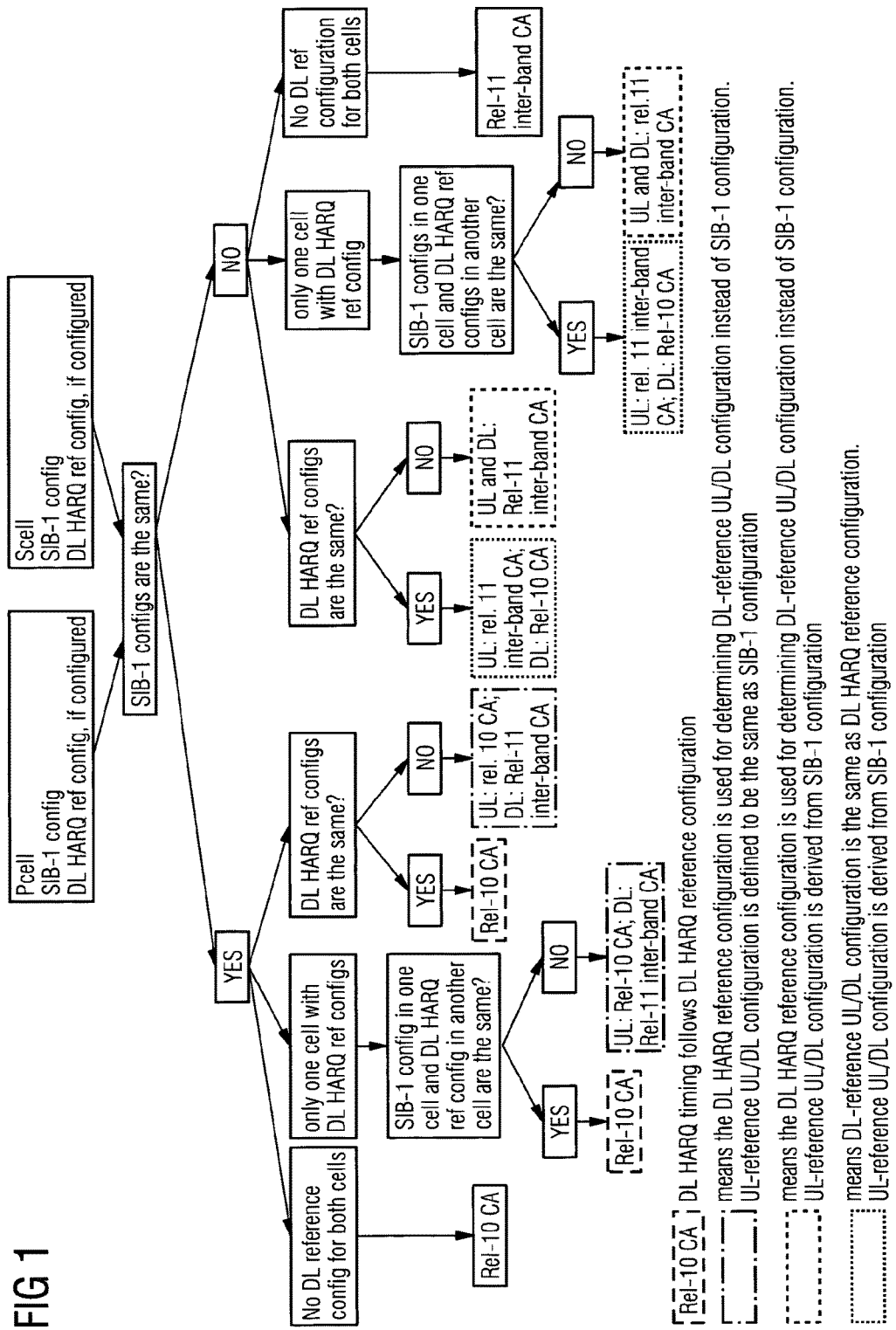
FIG. 1 illustrates deriving an uplink and downlink HARQ timing for eIMTA operation in accordance with one embodiment.

Embodiments of the invention relate to deriving secondary cell hybrid-automatic-repeat-request timing in the event that both enhanced-interference-management-and-traffic-adaptation (eIMTA) and carrier aggregation (CA) are configured for a user equipment. Specifically, embodiments of the present invention determine uplink (UL) and downlink (DL) reference configuration in the event that an eIMTA carrier is part of CA, and thus embodiments of the present invention determine HARQ timing for a secondary cell.

Time-division-duplex (TDD) eIMTA is described by a work item entitled "Further Enhancement to LTE TDD for DL-UL Interference Management and Traffic Adaptation." One goal of the work item is to enable more flexible uplink-downlink traffic adaptation, for example, in small cells.

One consequence of implementing the eIMTA feature is that a corresponding Enhanced Node B (eNB) may vary a TDD UL-DL configuration relatively often as compared to a typical scenario where the UL-DL configuration is generally unchanged. The TDD UL-DL configuration may be varied for those UEs which are using the eIMTA feature and which are configured for flexible UL-DL mode. The eIMTA feature that improves TDD capabilities in 3GPP Release 12 technologies can provide significant performance benefits in a small-cell environment.

In addition to the above-described work item relating to eIMTA, there is also an ongoing parallel 3GPP Release 12 work item relating to frequency-division-duplexing-time-division-duplexing (FDD-TDD) carrier aggregation. This parallel work item is entitled "LTE TDD-FDD Joint Operation including Carrier Aggregation," see details in RP-131399. This parallel work item describes options where a FDD cell acts as a primary cell as well as options where a TDD cell acts as a primary cell.

The so called reference configuration principle is applied when determining HARQ and scheduling timing in both Rel-11 Carrier Aggregation and in Rel-12 eIMTA. Reference configuration scheme is realized by applying HARQ and scheduling timing based on different but existing TDD configurations for uplink and downlink. There are certain rules that may need to be applied when determining the DL and UL HARQ reference configurations for a certain scenario. The main principle is that the selected DL (or UL) reference configuration must fulfill the so called subset relation. For example, when determining DL reference configuration (called as X) for the scenario involving UL-DL configuration A, then X must be is selected in a way that DL subframes corresponding to UL-DL configuration A form a subset of DL subframes defined by X. Similar rule is applied when determining the UL reference configuration.

Embodiments of the present invention are directed to deriving Hybrid-Automatic-Repeat-Request (HARQ) timing for secondary cells when both eIMTA and carrier aggregation are configured for a user equipment (UE). It has been agreed that the eIMTA feature will generally support carrier aggregation (CA), which means that an eIMTA-capable UE can be configured with multiple serving cells. Each of the serving cells can be eIMTA-enabled.

In Rel-10 carrier aggregation, the serving cells have the same UL-DL configuration. Hence, the UL and DL HARQ timing is same as the single carrier operation and it just follows the timing defined in Rel-8 (i.e. it is determined based on the SIB-1 signaled UL-DL configuration).

In Rel-11 inter-band TDD CA with different UL-DL configurations, the UL-reference and DL-reference UL/DL configurations are defined to determine the UL and DL HARQ timing. UL & DL-reference UL/DL configurations are derived from on the SIB-1 signaled UL-DL configurations of the serving cells.

The related UE behaviours are defined in TS 36.213 [3] corresponding to Rel-10 and Rel-11 CA respectively.

In Rel-12 eIMTA, the DL HARQ reference configuration is defined to determine the DL HARQ timing whereas the UL HARQ timing follows the SIB-1 signaled UL-DL configuration. So basically there are three different types of UL-DL configurations involved. For that reason, HARQ timing related to TDD eIMTA operation with CA needs to be clarified.

Considering the case when two serving cells have the same UL-DL configuration, but one of the serving cells is eIMTA enabled having the DL reference configuration signaled via RRC signaling. If Rel-10 HARQ timing operation was simply followed, the two cells would have the same DL HARQ timing, which is same as the timing of SIB-1 signaled UL-DL configuration. Thus, for eIMTA enabled cell, the UL subframe(s) reconfigured as DL subframe(s) would not have corresponding the PUCCH resources on UL subframe(s) for sending the HARQ-ACK feedback. Basically, this means that if Rel-10 CA HARQ operation is simply applied without any modifications, the eIMTA is in practice disabled, which obviously is not the intention in the design of eIMTA operation with CA.

According to certain embodiments, there may be at least two possible approaches for determining HARQ timing when eIMTA is operating with CA:

Approach #1: Rel-11 inter-band TDD CA HARQ timing determination method is applied if at least one of the serving cells is eIMTA enabled. The DL-reference UL-DL configuration can be derived based on DL HARQ reference configuration(s) instead of SIB-1 signaled UL-DL configuration(s); UL-reference UL-DL configuration is determined according to SIB-1 signaled UL-DL configuration.

Approach #2: UL and DL HARQ timings are determined separately,

UL HARQ timing is defined according to Rel-10 CA or according to Rel-11 CA depending on whether the SIB-1 configurations for the PCell and the SCell are the same or not.

DL reference configuration determines DL HARQ operation either according to Rel-10 CA or according to Rel-11 CA.
  a. In case when the DL HARQ reference configurations are the same for serving cells, or SIB-1 signaled UL-DL configuration in one cell and DL HARQ reference configuration in another cell are the same, the HARQ timings are derived similarly as in Rel-10 CA, with an exception that DL HARQ reference configuration is used instead of SIB-1 signaled UL-DL configuration to determine PDSCH HARQ timing.
  b. For other cases, HARQ timings are derived similarly as in Rel-11 CA, with an exception that DL HARQ reference configuration is used instead of SIB-1 signaled UL-DL configuration to determine the DL-reference UL-DL configuration.

The standard impacts of above two approaches are slightly different; Approach #1 could have less standard impact compared to Approach #2. This is due to the fact that there is no need to separate different cases to derive the HARQ timing based on different rules in Approach #2. However, from a performance point of view Approach #2 may result in a better solution: if Rel-11 HARQ timing determination is always adopted and PUCCH format 1b with channel selection is configured, as discussed in Rel-11 inter-band TDD CA, some of HARQ-ACK states could be overlapped in the mapping table or the bundling window size could be zero in one of serving cell for some Pcell and Scell combinations.

In the following description, the most relevant 3GPP agreements that are related to embodiments of the present invention are described as follows.

With regard to RAN1#74, downlink HARQ timing for eIMTA can follow a higher-layer TDD configuration configured by Radio-Resource-Control (RRC) signaling (such as a DL HARQ reference configuration, for example).

With regard to RAN1#74bis, TDD UL-DL configurations {2, 4, 5} can be selected as a DL HARQ reference configuration. Also, the following UE behavior has been agreed to under any valid UL and DL HARQ reference configuration. The UE should not expect any subframe configured as a UL subframe, nor expect any special subframe in a DL HARQ reference configuration that is dynamically used as a DL subframe.

With regard to RAN1#75, UL HARQ timing follows a UL-DL configuration defined by a System Information Block 1 (SIB-1). For UEs configured with both eIMTA and carrier aggregation (CA), up to 2 component carriers (CCs) with DL HARQ reference configuration #5 can be supported.

With regard to RAN1#76, Physical Uplink Control Channel (PUCCH) format 1b with channel selection is supported for Hybrid-Automatic-Repeat-Request-Acknowledgment (HARQ-ACK) feedback for TDD eIMTA, along with a mapping table introduced in 3GPP Release 10. Physical-Uplink-Control-Channel (PUCCH) format 3 is supported for HARQ-ACK feedback for TDD eIMTA.

Up until 3GPP Release 11, if PUCCH format 1b with channel selection or PUCCH format 3 was configured for DL HARQ-ACK feedback, there were two kinds of defined HARQ timings for performing carrier aggregation. With regard to the first kind of HARQ timing, when two serving cells have the same SIB-1 UL-DL configuration, HARQ and scheduling timing follow the SIB-1 UL-DL configuration for both cells. With regard to the second kind of HARQ timing, when two serving cells have different SIB-1 UL-DL configuration, DL reference UL-DL configuration and UL reference UL-DL configuration are defined to determine (UL&DL) HARQ and scheduling timing for the serving cells.

However, if a UE is configured with Release 12 TDD eIMTA, the DL HARQ reference configuration that is configured by Radio-Resource-Control (RRC) signaling determines (1) the HARQ and scheduling timing as well as (2) the set of available TDD UL-DL configurations together with (3) a cell-specific TDD UL-DL configuration defined by SIB-1. One out of three existing TDD UL-DL configurations {2, 4, 5} can be selected as a DL HARQ reference configuration in case eIMTA is used. FIG. 3 illustrates uplink/downlink configurations in accordance with one embodiment.

If a UE is configured simultaneously with eIMTA and with carrier aggregation, the corresponding HARQ and scheduling timing that are used in accordance with the above-described rules can create problems. Suppose two serving cells can have the same UL-DL configuration signaled by an SIB-1. Further suppose that the secondary cell is eIMTA-enabled.

When carrier aggregation is used there is a number of serving cells, one for each component carrier. The coverage of the serving cells may differ—due to e.g. component carrier frequencies. The RRC connection is handled by one cell, the Primary serving cell, served by the Primary component carrier (DL and UL PCC). The other component carriers are all referred to as Secondary component carrier (DL and possibly UL SCC), serving the Secondary serving cells.

Upon applying the above-described rules, the Physical Downlink Shared Channel (PDSCH) HARQ timing of the Primary cell (Pcell) would follow the SIB-1 UL-DL configuration. On the other hand, the PDSCH HARQ timing of the Secondary cell (Scell) would follow the DL HARQ reference configuration. As such, PDSCH HARQ timing would be different for the two cells.

Further, even if the PDSCH HARQ timing of the secondary cell (Scell) follows the SIB-1 UL-DL configuration according to the Release 10 Carrier Aggregation (CA) rule (i.e., the rule pertaining to two serving cells using the same SIB-1 UL-DL configuration), PDSCH transmissions in flexible (DL) subframes of the SCell do not have a valid UL subframe that is available to carry the HARQ-ACK bits.

In view of the above example which illustrates the potential problems, when eIMTA and carrier aggregation are used at the same time, the HARQ rules and timing rules (which govern SIB-1 and/or DL&UL reference UL-DL configurations) may need to be considered together to determine the Scell HARQ timing. Embodiments of the present invention provide HARQ-timing rules that are applicable when supporting eIMTA together with carrier aggregation, including the cases when the SIB-1 signaled UL-DL configurations are different between PCell and SCell.

FIG. 1 illustrates deriving an uplink and downlink HARQ timing for eIMTA operation in accordance with one embodiment. Embodiments of the present invention can derive a HARQ timing for a secondary cell even if both eIMTA and CA are configured for a UE. Specifically, embodiments of the present invention include two solutions.

In the first solution, serving cells (the PCell and the SCell) may have the same SIB-1 signaled UL-DL configurations.

Given that the serving cells have the same SIB-1 signaled UL-DL configurations:

If the (eIMTA) DL HARQ reference configurations for the PCell and the SCell are not the same, or (in the case when only one cell has a defined DL HARQ reference configuration) if the SIB-1 signaled UL-DL configuration in one cell and the DL HARQ reference configuration in another cell are not the same, then:

In one embodiment, with SCell UL, UL scheduling/PUSCH HARQ timing follows Release 10 rules. In one embodiment, the UL scheduling/PUSCH HARQ timing follow the SIB-1 signaled UL-DL configuration.

In one embodiment, with SCell DL, the DL-reference UL-DL configuration for the SCell can be derived according to Release 11 Carrier Aggregation rules defined for the case with different UL-DL configurations. FIG. 4 illustrates rules in accordance with one embodiment. In one embodiment, the only exception compared to Release 11 CA rules is that (eIMTA) DL HARQ reference configuration is used as an input to determine the (CA) DL-reference UL-DL configuration instead of SIB-1 signaled UL-DL configuration. FIG. 4 illustrates the rule implemented in a tabular format. However, there are also other ways available to implement the rules, for example by means of equations. Accordingly, FIG. 4 illustrates just one example possibility.

Otherwise, if the DL HARQ reference configurations are the same, or the SIB-1 signaled UL-DL configuration in one cell and the DL HARQ reference configuration in the other cell are the same, the HARQ timing for the SCell is derived similarly as in accordance with Release 10 carrier aggregation, with an exception that (eIMTA) DL HARQ reference configuration may be used instead of SIB-1 signaled UL-DL configuration to determine PDSCH HARQ timing.

In the first solution, serving cells may also have different SIB-1 signaled UL-DL configurations. Given that the serving cells have different SIB-1 signaled UL-DL configurations:

if the DL HARQ reference configurations are the same for the PCell and for the SCell, or if the SIB-1-signaled UL-DL configuration in one cell and a DL HARQ reference configuration defined for another cell are the same:

In one embodiment, for SCell UL, UL-reference UL-DL configuration is derived according to rules defined for Release 11 carrier aggregation having different UL-DL configurations (SIB-1 signaled UL-DL configurations are used as inputs to determine the UL-reference UL-DL configuration similarly as in Release 11 CA).

In one embodiment, for SCell DL, PDSCH HARQ timing of a SCell is defined according to Release 10 rules. For example, rules defined for the case when two serving cells have the same SIB-1 UL-DL configuration, with an exception that PDSCH HARQ timing follows (eIMTA) DL HARQ reference configuration instead of SIB-1 UL-DL configuration.

Otherwise, if the DL HARQ reference configurations are different for the PCell and for the SCell, or of the SIB-1-signaled UL-DL configuration in one cell and the DL-HARQ reference configuration defined for another cell are not the same, timing for the Scell can be derived similarly as in Release 11 CA, with an exception that (eIMTA) DL HARQ reference configuration may be used instead of SIB-1 signaled UL-DL configuration to determine the DL-reference UL-DL configuration.

In a second solution, a Release 11 inter-band TDD HARQ timing determination method can be applied if at least one of the serving cells is eIMTA enabled. For SCell DL, (eIMTA) DL HARQ reference configuration(s) can replace SIB-1 signaled UL-DL configuration(s) in a rule when deriving the SCell's DL-reference UL-DL configuration. For SCell UL, UL-referenced UL-DL configuration is determined according to SIB-1 signaled UL-DL configurations.

If a UE is configured with TDD-FDD CA, and the TDD eIMTA-enabled cell is a primary cell, a FDD secondary cell DL HARQ timing is determined according to a DL HARQ reference configuration of the PCell.

Embodiments of the present invention can apply to technologies that use self-scheduling and technologies that use cross-carrier scheduling.

In one embodiment of the present invention, the function of an eNB can include the following steps. The eNB can determine the SIB-1 UL-DL configuration for a PCell and/or a SCell. The eNB can then broadcast the configuration to the UEs in the corresponding cell. The eNB can enable eIMTA for the PCell and/or the SCell for a given UE via RRC configuration, and the eNB can also configure the UE with the DL HARQ reference UL-DL configuration. The eNB can derive the HARQ-ACK timing for the SCell depending on the SIB-1 UL-DL configurations, and determine the DL HARQ reference configurations based on specified rules according to the previously-described first and second solutions. The eNB can receive HARQ-ACK feedback on PUCCH or PUSCH according to the derived timing.

In other embodiments of the present invention, the function of the UE can include the following steps. The UE can receive the UL-DL configuration for a PCell and/or a SCell. The UE can be enabled with eIMTA for the PCell and/or for the SCell via RRC signaling, and the UE can be configured with the DL HARQ reference UL-DL configuration for each eIMTA enabled cell. The UE can then derive the HARQ-ACK timing for the SCell depending on the SIB-1 UL-DL configurations and the DL HARQ reference configurations based on specified rules according to the previously-described first and second solutions. The UE can then transmit HARQ-ACK feedback on PUCCH or PUSCH according to the determined timing.

In case eIMTA is operated with Release 10 or Release 11 carrier aggregation, a method for deriving Scell HARQ timing issues may be needed. Embodiments of the present invention can provide complete solutions for all possible combinations as shown in FIG. 1.

As previously described, if the serving cells have the same UL-DL configuration signaled by SIB-1 but have different (eIMTA) DL HARQ reference configurations, according to Release 10 carrier aggregation criteria, a serving cell's PDSCH HARQ timing just follows the SIB-1 configuration. However, the actual PDSCH HARQ timings in serving cells are different, which may create HARQ feedback problems, such as the UL subframe with PUCCH transmission being not available for some Scell PDSCH transmissions. In other words, some DL subframe(s) changing from UL subframe(s) in eIMTA may not be scheduled. As such, the performance gain of eIMTA can be lost.

Figure 2:
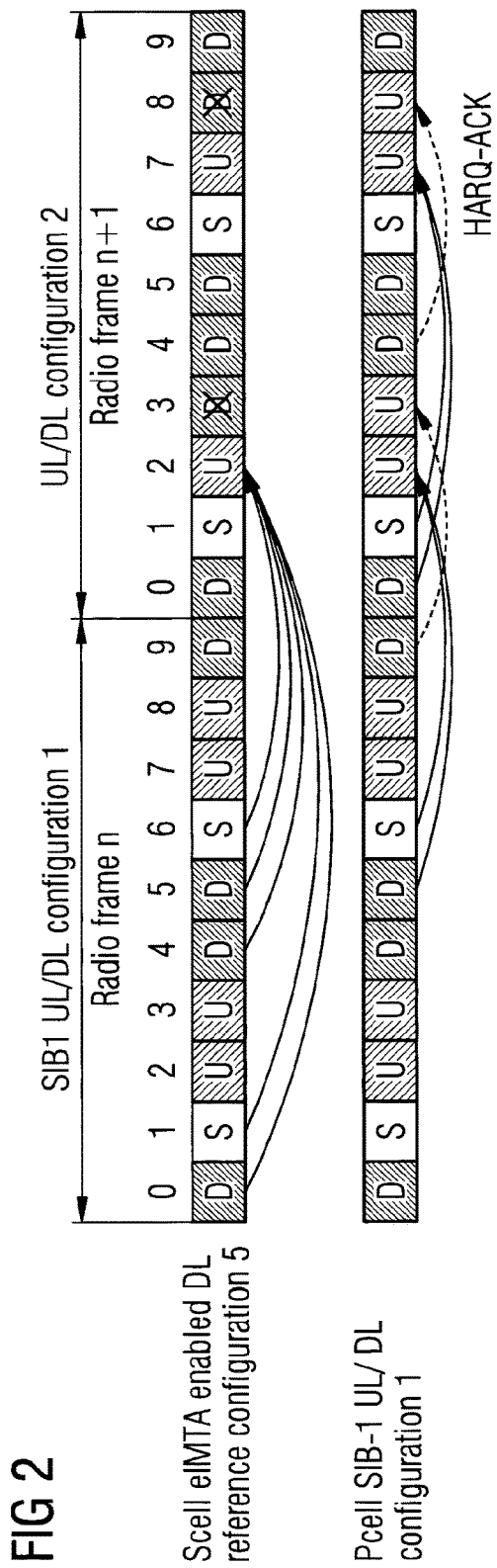
FIG. 2 illustrates a physical-downlink-shared-channel HARQ timing of a primary cell and a secondary cell in accordance with one embodiment.

FIG. 2 illustrates a physical-downlink-shared-channel HARQ timing of a primary cell and a secondary cell in accordance with one embodiment. The Pcell and Scell can have the same UL-DL configuration #1, but the Scell can be eIMTA enabled, and a DL HARQ reference configuration may be configuration #5. If Scell configuration changes to the UL-DL configuration #2, the subframe #3 and #8 change to a DL subframe. If PDSCH HARQ timing follows SIB-1 configuration as according to Release 10 CA, for example, configuration #1, then DL subframe #3 and #8 generally cannot be scheduled, because these subframes are UL subframes according to SIB-1 configuration. Assuming that the Scell may be changed dynamically to configuration #5 (according to eIMTA operation), all the flexible subframes {#3, #7, #8} generally cannot be scheduled. The eIMTA in Scell may be disabled.

Referring to the first solution, certain embodiments of the present invention can operate in a similar manner as inter-band CA. For example, serving cells can have different UL-DL configurations in downlink. DL-reference UL-DL configuration can be determined according to a DL HARQ reference configuration, the DL-reference UL-DL configuration for a Scell can be based on a pair formed by (primary cell UL-DL configuration—secondary cell DL HARQ reference configuration), for example, (1, 5), then the DL-reference UL-DL configuration for Scell is configuration #5 for self-scheduling. With the first solution, the Scell PDSCH HARQ timing follows the configuration #5, which means that all the flexible subframes can be scheduled, and the eIMTA performance gain is fully available also in the case of carrier aggregation.

In this example, UL-reference UL-DL configuration can be the same as the UL scheduling/PUSCH HARQ timing defined by SIB-1 configuration, for example, configuration #1. As such, embodiments of the present invention may have no impact in UL side.

In embodiments of the present invention, HARQ-ACK feedback with PUCCH format 1b with channel selection or PUCCH format 3 can be correctly reported when at least one of the serving cells is eIMTA-enabled.

If a UE is configured with eIMTA and TDD-FDD CA, both features can work properly with embodiments of the present invention, and the performance gain of eIMTA can be fully obtained with the proposed solutions.

Implementing embodiments of the present invention may result in minor impacts to standards and will generally not require any new HARQ design. Embodiments of the present invention can be backward compatible with Release 10 and Release 11 Carrier Aggregation.

Figure 5:
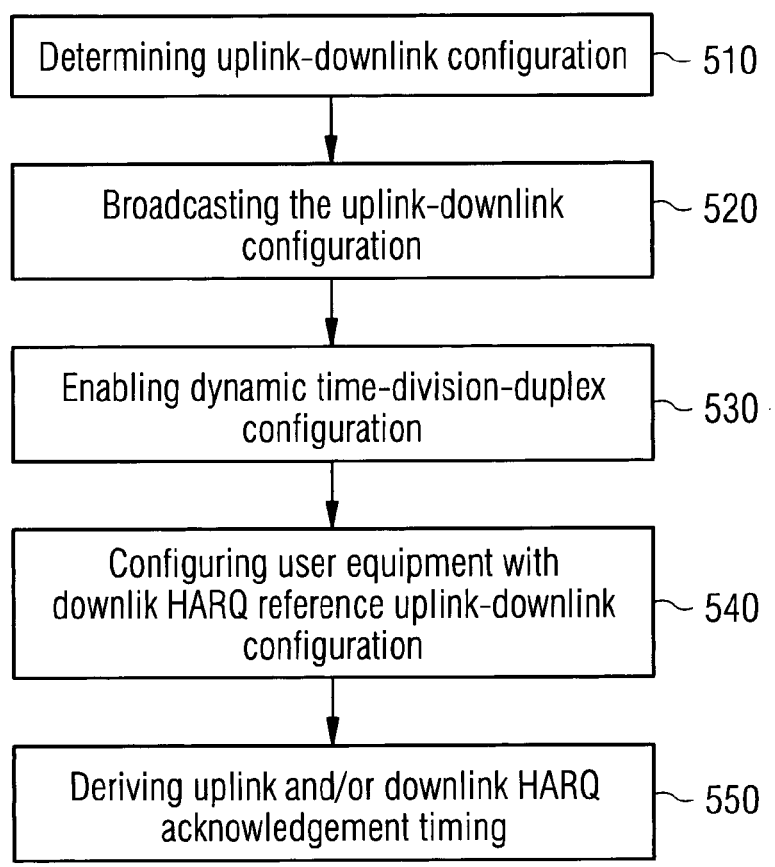
FIG. 5 illustrates a logic flow diagram for a method in accordance with embodiments of the invention.

FIG. 5 illustrates a logic flow diagram of a method according to certain embodiments of the invention. The method illustrated in FIG. 5 includes, at 510, determining, by a network entity, uplink-downlink configuration for a primary cell and at least one secondary cell. The method also includes, at 520, broadcasting the uplink-downlink configuration to user equipment. The user equipment is configured for carrier aggregation. The method also includes, at 530, enabling dynamic time-division-duplex configuration for the primary cell and/or the at least one secondary cell for the user equipment. The method also includes, at 540, configuring the user equipment with downlink hybrid-automatic-repeat-request reference uplink-downlink configuration for each cell for which dynamic time-division-duplex configuration is enabled. The method also includes, at 550, deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

Figure 6:
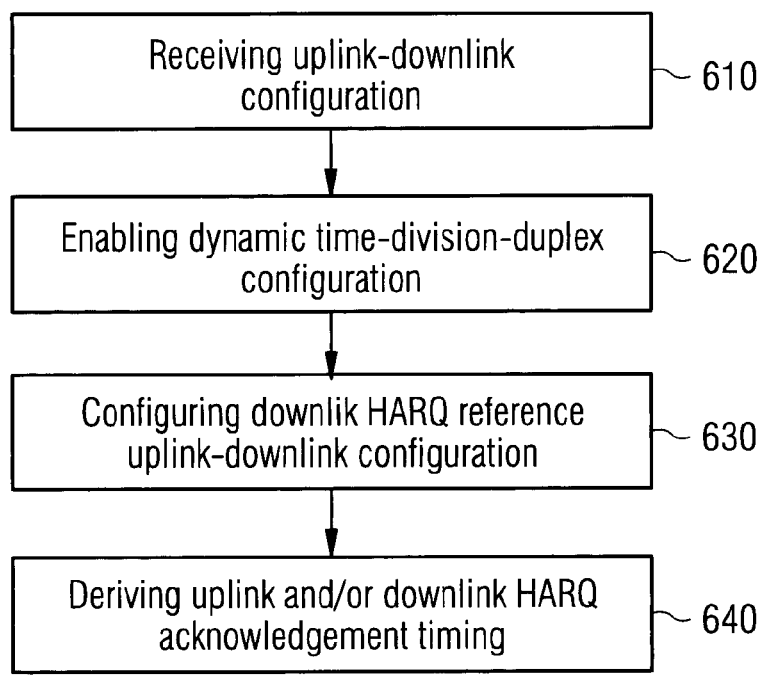
FIG. 6 illustrates a logic flow diagram for a method in accordance with embodiments of the invention.

FIG. 6 illustrates a logic flow diagram of a method according to certain embodiments of the invention. The method illustrated in FIG. 6 includes, at 610, receiving uplink-downlink configuration for a primary cell and at least one secondary cell. The method includes, at 620, enabling dynamic time-division-duplex configuration for the primary cell and/or the at least one secondary cell for the user equipment. The method also includes, at 630, configuring downlink hybrid-automatic-repeat-request reference uplink-downlink configuration for each cell for which dynamic time-division-duplex configuration is enabled. The method also includes, at 640, deriving uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

Figure 7:
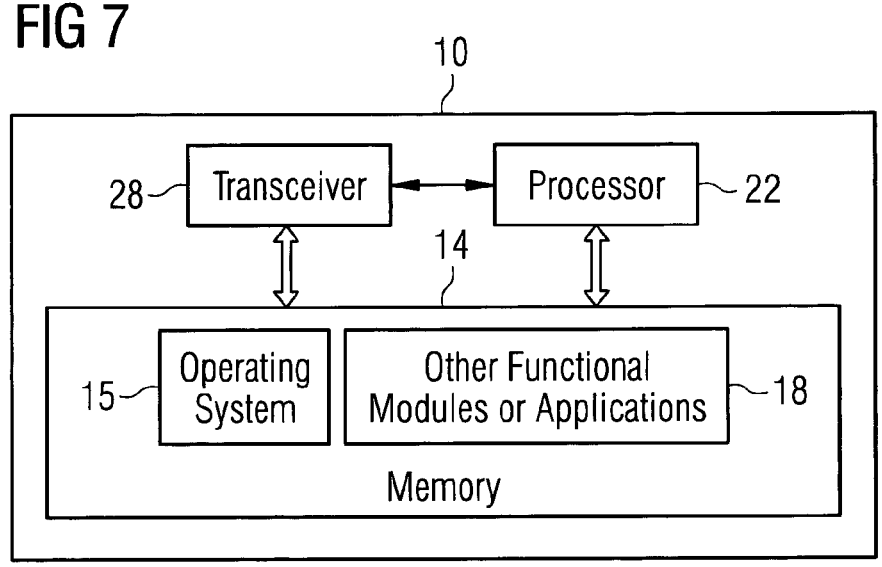
FIG. 7 illustrates an apparatus in accordance with embodiments of the invention.

FIG. 7 illustrates an apparatus 10 according to embodiments of the invention. Apparatus 10 can be a receiving device, such as a UE, for example. In other embodiments, apparatus 10 can be an eNB and/or a base station, for example.

Apparatus 10 can include a processor 22 for processing information and executing instructions or operations. Processor 22 can be any type of general or specific purpose processor. While a single processor 22 is shown in FIG. 7, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In certain embodiments, memory 14 stores software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 8:
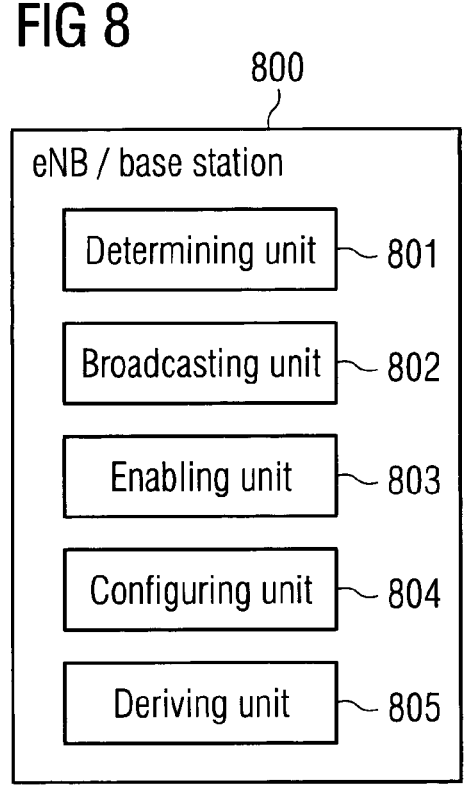
FIG. 8 illustrates an apparatus in accordance with embodiments of the invention.

FIG. 8 illustrates an apparatus 800 according to other embodiments of the invention. Apparatus 800 can be, for example, a base station and/or an eNB. Apparatus 800 can include a determining unit 801 that determines uplink-downlink configuration for a primary cell and at least one secondary cell. Apparatus 800 also includes a broadcasting unit 802 that broadcasts the uplink-downlink configuration to user equipment. The user equipment is configured for carrier aggregation. Apparatus 800 also includes an enabling unit 803 that enables dynamic time-division-duplex configuration for the primary cell and/or the at least one secondary cell for the user equipment. Apparatus 800 also includes a configuring unit 804 that configures the user equipment with downlink hybrid-automatic-repeat-request reference uplink-downlink configuration for each cell for which dynamic time-division-duplex configuration is enabled. Apparatus 800 also includes a deriving unit 805 that derives uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

Figure 9:
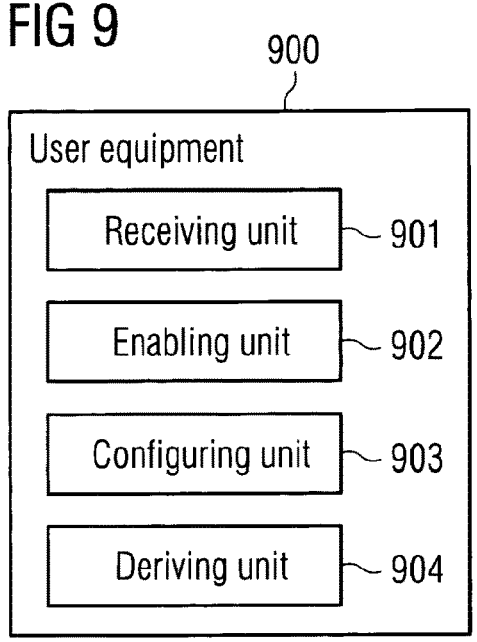
FIG. 9 illustrates an apparatus in accordance with embodiments of the invention.

FIG. 9 illustrates an apparatus 900 according to other embodiments of the invention. Apparatus 900 can be, for example, a user equipment. Apparatus 900 can include a receiving unit 901 that receives uplink-downlink configuration for a primary cell and at least one secondary cell. Apparatus 900 can also include an enabling unit 902 that enables dynamic time-division-duplex configuration for the primary cell and/or the at least one secondary cell for the apparatus 900. Apparatus 900 can also include a configuring unit 903 that configures downlink hybrid-automatic-repeat-request reference uplink-downlink configuration for each cell for which dynamic time-division-duplex configuration is enabled. Apparatus 900 can also include a deriving unit 904 that derives uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

Figure 10:
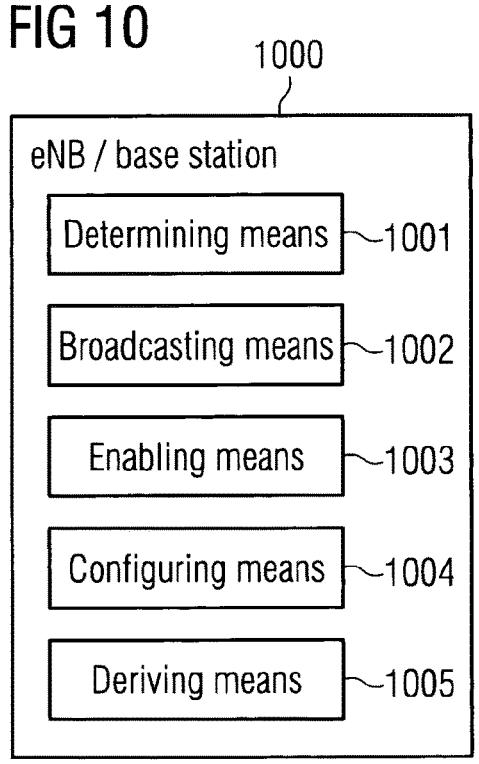
FIG. 10 illustrates an apparatus in accordance with embodiments of the invention.

FIG. 10 illustrates an apparatus 1000 according to other embodiments of the invention. Apparatus 1000 can be, for example, a base station and/or an eNB. Apparatus 1000 can include a determining means 1001 that determines uplink-downlink configuration for a primary cell and at least one secondary cell. Apparatus 1000 also includes a broadcasting means 1002 that broadcasts the uplink-downlink configuration to user equipment. The user equipment is configured for carrier aggregation. Apparatus 1000 also includes an enabling means 1003 that enables dynamic time-division-duplex configuration for the primary cell and/or the at least one secondary cell for the user equipment. Apparatus 1000 also includes a configuring means 1004 that configures the user equipment with downlink hybrid-automatic-repeat-request reference uplink-downlink configuration for each cell for which dynamic time-division-duplex configuration is enabled. Apparatus 1000 also includes a deriving means 1005 that derives uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

Figure 11:
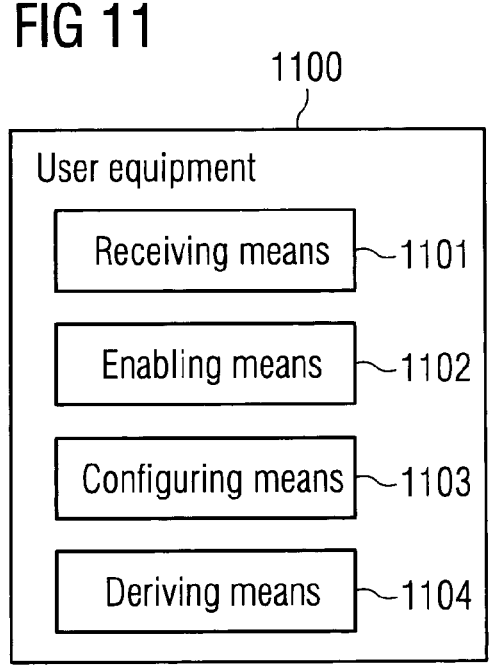
FIG. 11 illustrates an apparatus in accordance with embodiments of the invention.

FIG. 11 illustrates an apparatus 1100 according to other embodiments of the invention. Apparatus 1100 can be, for example, a user equipment. Apparatus 1100 can include a receiving means 1101 that receives uplink-downlink configuration for a primary cell and at least one secondary cell. Apparatus 1100 can also include an enabling means 1102 that enables dynamic time-division-duplex configuration for the primary cell and/or the at least one secondary cell for the apparatus 1100. Apparatus 1100 can also include a configuring means 1103 that configures downlink hybrid-automatic-repeat-request reference uplink-downlink configuration for each cell for which dynamic time-division-duplex configuration is enabled. Apparatus 1100 can also include a deriving means 1104 that derives uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

Figure 12:
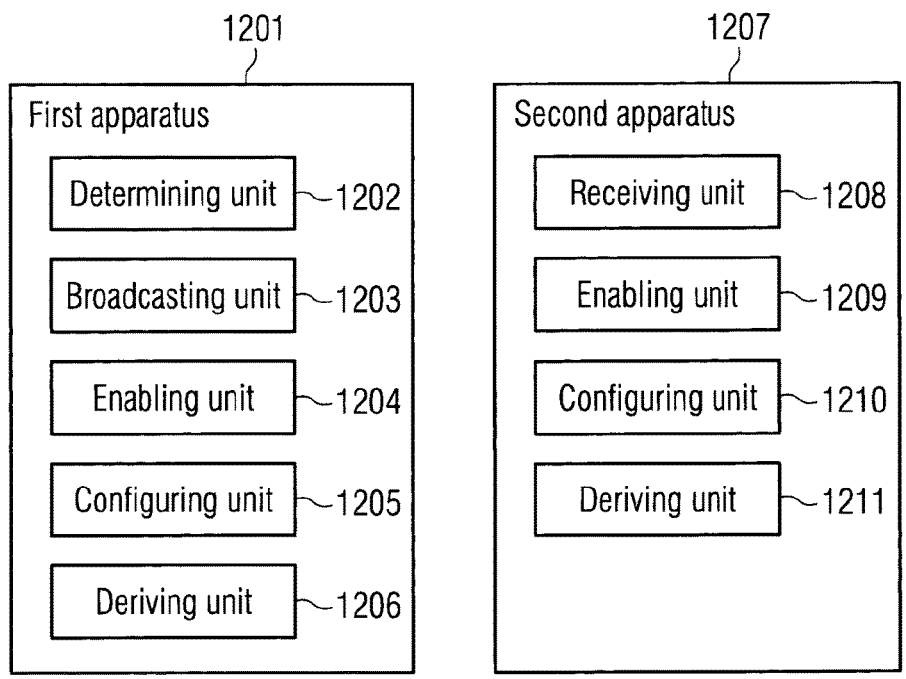
FIG. 12 illustrates a system in accordance with embodiments of the invention.

FIG. 12 illustrates a system in accordance with embodiments of the invention. The system 1200 can includes a first apparatus 1201 that includes a determining unit 1202 that determines uplink-downlink configuration for a primary cell and at least one secondary cell. First apparatus 1201 also includes a broadcasting unit 1203 that broadcasts the uplink-downlink configuration to second apparatus 1207. The second apparatus 1207 is configured for carrier aggregation. First apparatus 1201 also includes an enabling unit 1204 that enables dynamic time-division-duplex configuration for the primary cell and/or the at least one secondary cell for second apparatus 1207. First apparatus 1201 also includes a configuring unit 1205 that configures the second apparatus 1207 with downlink hybrid-automatic-repeat-request reference uplink-downlink configuration for each cell for which dynamic time-division-duplex configuration is enabled. First apparatus 1201 also includes a deriving unit 1206 that derives uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration. The system 1200 also includes the second apparatus 1207 that can include a receiving unit 1208 that receives the uplink-downlink configuration for the primary cell and the at least one secondary cell. The second apparatus 1207 can also include an enabling unit 1209 that enables the dynamic time-division-duplex configuration for the primary cell and/or the at least one secondary cell for the user equipment. The second apparatus 1207 can also include a configuring unit 1210 that configures downlink hybrid-automatic-repeat-request reference uplink-downlink configuration for each cell for which dynamic time-division-duplex configuration is enabled. The second apparatus 1207 can also include a deriving unit 1211 that derives uplink and/or downlink hybrid-automatic-repeat-request-acknowledgement timing for the at least one secondary cell based on at least one configured uplink-downlink configuration and at least one downlink hybrid-automatic-repeat-request reference uplink-downlink configuration.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one processor; and
   at least one memory including computer program code, the at least one memory and the computer program code configured, with the at least one processor, to cause the apparatus at least to:
   determine an uplink-downlink (UL/DL) configuration for a primary cell and at least one secondary cell, respectively;
   broadcast the UL/DL configurations to a user equipment, wherein the user equipment is configured for carrier aggregation;
   enable enhanced-interference-management-and-traffic-adaptation (eIMTA) for the primary cell and/or the at least one secondary cell for the user equipment;
   configure the user equipment with a DL hybrid-automatic-repeat-request (HARQ) reference UL/DL configuration for each cell for which eIMTA is enabled;
   derive UL and/or DL HARQ acknowledgement (ACK) timing for the at least one secondary cell based on the DL HARQ reference UL/DL configuration of the at least one secondary cell and at least one of the UL/DL configurations, wherein deriving the UL and/or DL HARQ ACK timing comprises determining the UL and/or DL HARQ ACK timing according to at least one of the following:
      according to whether the DL HARQ reference UL/DL configurations for the primary cell and the at least one secondary cell are the same or not, and
      according to whether the UL/DL configuration in one serving cell and the DL HARQ reference UL/DL configuration in another serving cell are the same or not; and
   transmit and/or receive HARQ ACK feedback according to the determined HARQ ACK timing.

2. The apparatus according to claim 1, further causing the apparatus to:
   determine that the primary cell and the at least one secondary cell have the same UL/DL configurations, and
   determine at least one of the following: the DL HARQ reference UL/DL configurations are not the same for the primary cell and the at least one secondary cell, and the UL/DL configuration in one serving cell and the DL HARQ reference UL/DL configuration in another serving cell are not the same, and
   determine the UL HARQ ACK timing of the at least one secondary cell follows the UL/DL configuration of the corresponding secondary cell.

3. The apparatus according to claim 1, further causing the apparatus to:
   determine that the primary cell and the at least one secondary cell have the same UL/DL configurations,
   determine at least one of the following: the DL HARQ reference UL/DL configurations are not the same for the primary cell and the at least one secondary cell, and the UL/DL configuration in one serving cell and the DL HARQ reference UL/DL configuration in another serving cell are not the same, and
   wherein causing the apparatus to derive comprises causing the apparatus to derive the DL HARQ ACK timing for the at least one secondary cell in accordance with Release 11 carrier aggregation rules defined for a scenario with different UL/DL configurations in different cells, departing from the Release 11 carrier aggregation rules in that the DL HARQ reference UL/DL configuration of the corresponding secondary cell is used as an input to determine the DL HARQ ACK timing instead of the UL/DL configuration of the corresponding secondary cell.

4. The apparatus according to claim 1, further causing the apparatus to:
   determine at least one of the following: the DL HARQ reference UL/DL configurations are the same for the primary cell and the at least one secondary cell, and the UL/DL configuration in one serving cell and the DL HARQ reference UL/DL configuration in another serving cell are the same, and
   wherein causing the apparatus to derive comprises causing the apparatus to derive the DL HARQ ACK timing for the at least one secondary cell in accordance with Release 10 carrier aggregation rules, departing from the Release 10 carrier aggregation rules in that the DL HARQ reference UL/DL configuration of the corresponding secondary cell is used instead of the UL/DL configuration of the corresponding secondary cell to determine the DL HARQ ACK timing.

5. The apparatus according to claim 1, further causing the apparatus to:
   determine the UL/DL configurations for the primary cell and the at least one secondary cell are not the same,
   determine at least one of the following: the DL HARQ reference UL/DL configurations are the same for the primary cell and the at least one secondary cell, and the UL/DL configuration in one serving cell and the DL HARQ reference UL/DL configuration in another serving cell are the same, and
   wherein causing the apparatus to derive comprises causing the apparatus to derive the UL HARQ ACK timing for the at least one secondary cell according to the rules defined for Release 11 carrier aggregation having different UL/DL configurations in different cells.

6. The apparatus according to claim 1, further causing the apparatus to:
   determine that the UL/DL configurations for the primary cell and the at least one secondary cell are not the same,
   determine at least one of the following: the DL HARQ reference UL/DL configurations are the same for the primary cell and the at least one secondary cell, and the UL/DL configuration in one serving cell and the DL HARQ reference UL/DL configuration in another serving cell are the same, and wherein causing the apparatus to derive comprises causing the apparatus to derive the DL HARQ ACK timing of the at least one secondary cell according to Release 10 carrier aggregation rules, departing from the Release 10 carrier aggregation rules in that the DL HARQ ACK timing follows DL HARQ reference UL/DL configuration of the corresponding secondary cell.

7. The apparatus according to claim 1, further causing the apparatus to:

determine at least one of the following: the DL HARQ reference UL/DL configurations are not the same for the primary cell and the at least one secondary cell, and the UL/DL configuration in one serving cell and the DL HARQ reference UL/DL configuration in another serving cell are not the same, and wherein causing the apparatus to derive comprises causing the apparatus to derive the DL HARQ ACK timing for the at least one secondary cell in accordance with Release 11 carrier aggregation rules, departing from the Release 11 carrier aggregation rules in that the DL HARQ reference UL/DL configuration of the corresponding secondary cell is used instead of the UL/DL configuration of the corresponding secondary cell to determine the DL HARQ ACK timing.

8. A method, comprising:

receiving, by a user equipment, an uplink-downlink (UL/DL) configuration for a primary cell and at least one secondary cell, respectively;

receiving information that enhanced-interference-management-and-traffic-adaption, eIMTA, has been enabled for the primary cell and/or the at least one secondary cell for the user equipment;

receiving information of a DL hybrid-automatic-repeat-request, HARQ, reference UL/DL configuration for each cell for which dynamic eIMTA is enabled;

deriving UL and/or DL HARQ acknowledgement (ACK) timing for the at least one secondary cell based on the DL HARQ reference UL/DL configuration of the at least one secondary cell and at least one of the UL/DL configurations wherein deriving the UL and/or DL HARQ ACK timing comprises determining the UL and/or DL HARQ ACK timing according to at least one of the following:

according to whether the DL HARQ reference UL/DL configurations for the primary cell and the at least one secondary cell are the same or not, and according to whether the UL/DL configuration in one serving cell and the DL HARQ reference UL/DL configuration in another serving cell are the same or not; and transmitting and/or receiving HARQ ACK feedback according to the determined HARQ ACK timing.

9. The method according to claim 8, further comprising:

determining at least one of the following: the DL HARQ reference UL/DL configurations are the same for the primary cell and the at least one secondary cell, and the UL/DL configuration in one serving cell and the DL HARQ reference UL/DL configuration in another serving cell are the same, and deriving the DL HARQ ACK timing for the at least one secondary cell in accordance with Release 10 carrier aggregation rules, departing from the Release 10 carrier aggregation rules in that the DL HARQ reference UL/DL configuration of the corresponding secondary cell is used instead of the UL/DL configuration of the corresponding secondary cell to determine the DL HARQ ACK timing.

10. The method according to claim 8, further comprising:

determining at least one of the following: the DL HARQ reference UL/DL configurations are not the same for the primary cell and the at least one secondary cell, and the UL/DL configuration in one serving cell and the DL HARQ reference UL/DL configuration in another serving cell are not the same, and deriving the DL HARQ ACK timing for the at least one secondary cell in accordance with Release 11 carrier aggregation rules, departing from the Release 11 carrier aggregation rules in that the DL HARQ reference UL/DL configuration of the corresponding secondary cell is used instead of the UL/DL configuration of the corresponding secondary cell to determine the DL HARQ ACK timing.

11. An apparatus, comprising:

at least one processor; and at least one memory including computer program code, the at least one memory and the computer program code configured, with the at least one processor, to cause the apparatus at least to receive an uplink-downlink (UL/DL) configuration for a primary cell and at least one secondary cell, respectively;

receive information that enhanced-interference-management-and-traffic-adaption, eIMTA has been enabled for the primary cell and/or the at least one secondary cell for the apparatus;

receive information of a DL hybrid-automatic-repeat-request, HARQ, reference UL/DL configuration for each cell for which eIMTA is enabled;

derive UL and/or DL HARQ acknowledgement (ACK) timing for the at least one secondary cell based on the DL HARQ reference UL/DL configuration of the at least one secondary cell and at least one of the UL/DL configurations wherein deriving the UL and/or DL HARQ ACK timing comprises determining the UL and/or DL HARQ ACK timing according to at least one of the following:

according to whether the DL HARQ reference UL/DL configurations for the primary cell and the at least one secondary cell are the same or not, and according to whether the UL/DL configuration in one serving cell and the DL HARQ reference UL/DL configuration in another serving cell are the same or not; and transmit and/or receive HARQ ACK feedback according to the determined HARQ ACK timing.

12. The apparatus according to claim 11, further causing the apparatus to:

determine that the primary cell and the at least one secondary cell have the same UL/DL configurations, determine at least one of the following: the DL HARQ reference UL/DL configurations are not the same for the primary cell and the at least one secondary cell, and the UL/DL configuration in one serving cell and the DL HARQ reference UL/DL configuration in another serving cell are not the same, and determine that the UL HARQ ACK timing of the at least one secondary cell follows the UL/DL configuration of the corresponding secondary cell.

13. The apparatus according to claim 11, further causing the apparatus to:

determine that the primary cell and the at least one secondary cell have the same UL/DL configurations, determine at least one of the following: the DL HARQ reference UL/DL configurations are not the same for the primary cell and the at least one secondary cell, and the UL/DL configuration in one serving cell and the DL HARQ reference UL/DL configuration in another serving cell are not the same, and wherein causing the apparatus to derive comprises causing the apparatus to derive the DL HARQ ACK timing for the at least one secondary cell in accordance with Release 11 carrier aggregation rules defined for a scenario with different UL/DL configurations in different cells, departing from the Release 11 carrier aggregation rules in that the DL HARQ reference UL/DL configuration of the corresponding secondary cell is used as an input to determine the DL HARQ ACK timing instead of the UL/DL configuration of the corresponding secondary cell.

14. The apparatus according to claim 11, further causing the apparatus to:

determine at least one of the following: the DL HARQ reference UL/DL configurations are the same for the primary cell and the at least one secondary cell, and the UL/DL configuration in one serving cell and the DL HARQ reference UL/DL configuration in another serving cell are the same, wherein causing the apparatus to derive comprising causing the apparatus to derive the DL HARQ ACK timing for the at least one secondary cell in accordance with Release 10 carrier aggregation rules, departing from the Release 10 carrier aggregation rules in that the DL HARQ reference UL/DL configuration of the corresponding secondary cell is used instead of the UL/DL configuration of the corresponding secondary cell to determine the DL HARQ ACK timing.

15. The apparatus according to claim 11, further causing the apparatus to:

determine that the UL/DL configurations for the primary cell and the at least one secondary cell are not the same, determine at least one of the following: the DL HARQ reference UL/DL configurations are the same for the primary cell and the at least one secondary cell and the UL/DL configuration in one serving cell and the DL HARQ reference UL/DL configuration in another serving cell are the same, and wherein causing the apparatus to derive comprising causing the apparatus to derive the UL HARQ ACK timing for the at least one secondary cell according to the rules defined for Release 11 carrier aggregation having different UL/DL configurations in different cells.

16. The apparatus according to claim 11, wherein if the UL/DL configurations for the primary cell and the at least one secondary cell are not the same, and if the DL HARQ reference UL/DL configurations are the same for the primary cell and the at least one secondary cell, or if the UL/DL configuration in one serving cell and the DL HARQ reference UL/DL configuration in another serving cell are the same, wherein causing the apparatus to derive comprises causing the apparatus to derive the DL HARQ ACK timing of the at least one secondary cell according to Release 10 carrier aggregation rules, departing from the Release 10 carrier aggregation rules in that the DL HARQ ACK timing follows DL HARQ reference UL/DL configuration of the corresponding secondary cell.

17. The apparatus according to claim 11, further causing the apparatus to:

determine at least one of the following: the DL HARQ reference UL/DL configurations are not the same for the primary cell and the at least one secondary cell, and the UL/DL configuration in one serving cell and the DL HARQ reference UL/DL configuration in another serving cell are not the same, and wherein causing the apparatus to derive comprises causing the apparatus to derive the DL HARQ ACK timing for the at least one secondary cell is in accordance with Release 11 carrier aggregation rules, departing from the Release 11 carrier aggregation rules in that the DL HARQ reference UL/DL configuration of the corresponding secondary cell is used instead of the UL/DL configuration of the corresponding secondary cell to determine the DL HARQ ACK timing.

18. The apparatus according to claim 11, wherein the DL HARQ reference UL/DL configuration of the corresponding secondary cell replaces the UL/DL configuration of the corresponding secondary cell when deriving the corresponding secondary cell's DL HARQ ACK timing.

19. The apparatus according to claim 18, wherein the UL HARQ ACK timing for the at least one secondary cell is determined according to the UL/DL configuration of the corresponding secondary cell.

20. The apparatus according to claim 11, and further causing the apparatus to:

configure the apparatus with time-division-duplex-frequency-division-duplex, TDD/FDD, carrier aggregation, wherein the primary cell is a TDD eIMTA-enabled cell, and determine an FDD-enabled secondary cell's DL HARQ ACK timing according to the DL HARQ reference UL/DL configuration of the primary cell.

* * * * *